(No Model.) 7 Sheets—Sheet 3.

O. G. CRITCHETT.
HEEL BURNISHING MACHINE.

No. 313,185. Patented Mar. 3, 1885.

Fig. 3.

Witnesses: Eugene Humphrey, Henry H. Letteney

Inventor: Oliver G. Critchett
per Porter & Hutchinson
Attys (No Model.) 7 Sheets—Sheet 4.

O. G. CRITCHETT.
HEEL BURNISHING MACHINE.

No. 313,185. Patented Mar. 3, 1885.

Witnesses:
Eugene H Humphrey
Henry H. Letteney

Inventor:
Oliver G. Critchett
per Porter & Hutchinson
Attys (No Model.)

O. G. CRITCHETT.
HEEL BURNISHING MACHINE.

No. 313,185. Patented Mar. 3, 1885.

Witnesses:
Eugene Humphrey
Henry H. Letteney

Inventor:
Oliver G. Critchett
per Porter & Hutchinson
Attys (No Model.) 7 Sheets—Sheet 6.

O. G. CRITCHETT.
HEEL BURNISHING MACHINE.

No. 313,185. Patented Mar. 3, 1885.

Witnesses:
Eugene H Humphrey
Henry H Letteney

Inventor:
Oliver G. Critchett
pr Porter & Hutchinson
Attys

(No Model.) 7 Sheets—Sheet 7.

O. G. CRITCHETT.
HEEL BURNISHING MACHINE.

No. 313,185. Patented Mar. 3, 1885.

Witnesses:
Eugene Humphrey
Harry H. Letteney

Inventor:
Oliver G. Critchett
per Porter & Hutchinson, Attys

UNITED STATES PATENT OFFICE.

OLIVER G. CRITCHETT, OF BELFAST, MAINE.

HEEL-BURNISHING MACHINE.

SPECIFICATION forming part of Letters Patent No. 313,185, dated March 3, 1885.

Application filed November 19, 1884. (No model.)

*To all whom it may concern:*

Be it known that I, OLIVER G. CRITCHETT, of Belfast, in the county of Waldo and State of Maine, have invented a new and useful Improvement in Boot and Shoe Heel Burnishing Machines, which will, in connection with the accompanying drawings, be hereinafter fully described, and specifically defined in the appended claims.

This invention has for its object the production of a machine adapted to burnish the edge of boot and shoe heels by the action of a rotary disk.

Figures 5, 18, 19:
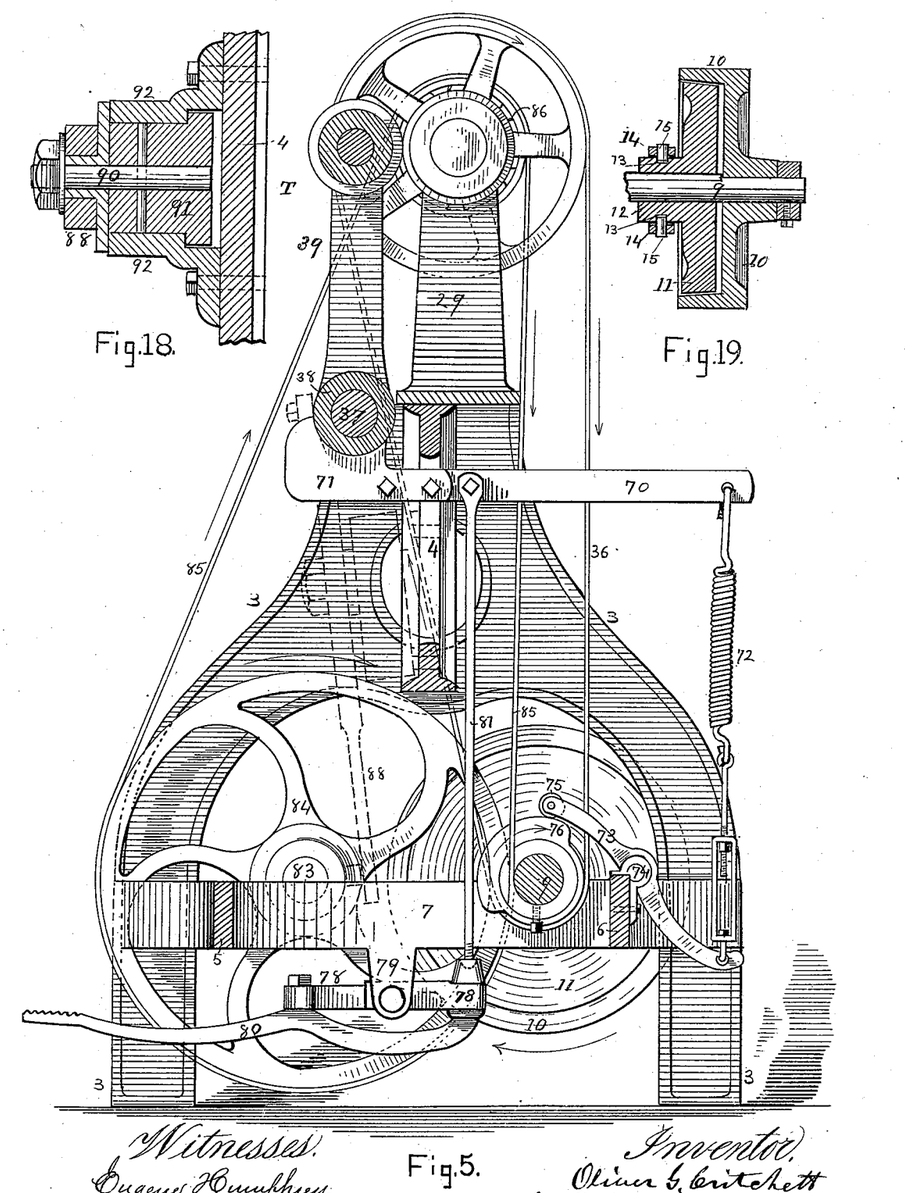
Fig. 5 is also a sectional elevation, the section being the same as in Fig. 4, but the elevation being as viewed from the right in said Fig. 1.
Fig. 18 is a horizontal section taken as on line S S, Fig. 16.
Fig. 19 is a horizontal section taken at the right-hand part of Fig. 17, and as through the axis of the driving-shaft, and showing the engagement of the clutch and its actuating-lever.

In said views, 2 represents the right-hand and 3 the left-hand leg or end frames of my machine. These legs are rigidly united by the cap-bar 4 and the lower front and rear longitudinal bars, 5 6, which latter are united by the cross-bars 7 8, nothing in this frame being claimed as novel. A driving-shaft, 9, is journaled in bearings in said end frames, 2 3, and power is imparted to said shaft by means of a driving-belt acting on pulley 10, Fig. 17, which is loose on the shaft, but is locked by clutch 11, which is splined or interlocked with the shaft to produce coincident rotation, but slides freely thereon by means of lever 14, which is pivoted at 16 to bracket 17, and which by the engagement of its pins 15 in the concentric groove in the hub 12 of the clutch, as shown in Fig. 19, serves as the means by which said clutch may be moved along the shaft to engage with and be disengaged from said pulley 10. In order to vibrate said lever 14, its upper end is connected by rod 18 with angle-lever 19, pivoted on frame 3, while a rod, 20, connects the horizontal arm of said lever 19 with arm 21, secured on rock-shaft 22, which is pivoted in the rear part of legs 2 3, and at the opposite end of said rock-shaft a treadle, 24, is rigidly secured thereon, and provided with an elevating-spring, 28, which raises it when liberated. Upon the upper side of this treadle is a tooth or stud, 25, while in a disk, 26, secured on driving-shaft 9, is a recess, 27, into which said stud 25 engaging when the treadle is raised by said spring 28. By these devices the depression of treadle 24 will depress arm 21 on the same rock-shaft, thereby actuating angle-lever 19, and through lever 14 engaging clutch 11 with pulley 10, thus causing shaft 9 to be rotated coincidently with the pulley, and when said treadle is released it will by its spring be raised till its stud 25 is in contact with the periphery of disk 26, which disk will continue to revolve till its recess 27 is in conjunction with stud 25, when the stud will enter said recess, thereby allowing a further rotation of rock-shaft 22, and a consequent drawing of clutch 11 from pulley 10, while at the instant that said stud 25 is seated in said recess 27 the toe 23 at the lower end of lever 14 will by the vibration of said lever on its pivot 16 be forced against clutch 11, thereby acting thereon as a brake to arrest the same and the shaft 9 from further rotation, and relieving said stud 25 from shock and wear. It will thus be obvious that shaft 9 will always be arrested at the same point in its revolution, the utility whereof will be pointed out in connection with the description of the shoe-actuating devices.

At the left-hand end of the machine is a bracket or standard, 29, (shown clearly in the rear view, Fig. 2,) which is preferably formed as part of cap-bar 4. In the top of this bracket is journaled the arbor 30, on which is secured at its inner end, the chambered burnishing-disk 31, which is heated by steam admitted through pipe 32, which in its horizontal portion is arranged axially in arbor 30, the exhaust-steam passing out through escape-pipe 33, a stuffing-box, 34, secured to the outer part of bracket 29, serving as the outer bearing of the arbor and the connection for the inlet and outlet pipes. Rotary motion is imparted to said arbor and disk by belt 36, which is driven by a pulley on the already-described shaft 9, said belt acting on pulley 35, secured on arbor 30, said arbor, disk, stuffing-box, and steam-pipes being substantially the same as are described and shown in United States Patent No. 149,922, issued to me on the 21st day of April, 1874, to which reference is to be had.

For the purpose of supporting and actuating the shoe, a sliding rock-shaft, 37, is journaled in suitable bearings formed upon end frames, 2 3, at the front of the top part thereof, and the sleeve 38 of a jack is mounted on said shaft, and is locked rigidly thereon by the set-screws 142. (Shown in Fig. 1.) At the left-hand end of said sleeve is formed an arm, 39, in the top of which is journaled to revolve freely the disk 40, the same being lineally adjusted by a step-screw, 41, threaded in arm 39 in a well-known manner.

Figure 3:
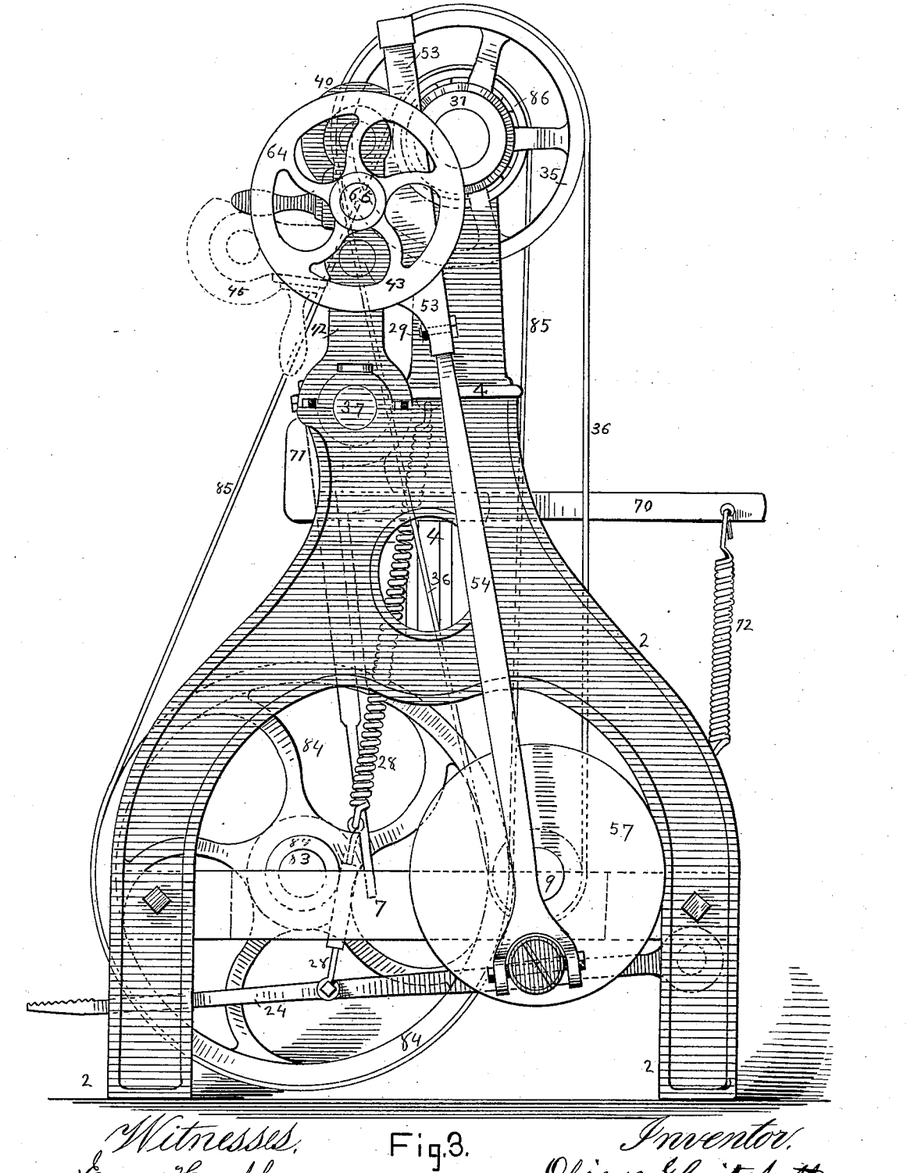
Fig. 3 is an end elevation taken as viewed at the right of Fig. 1 and left of Fig. 2.
Figures 4, 6, 7, 8:
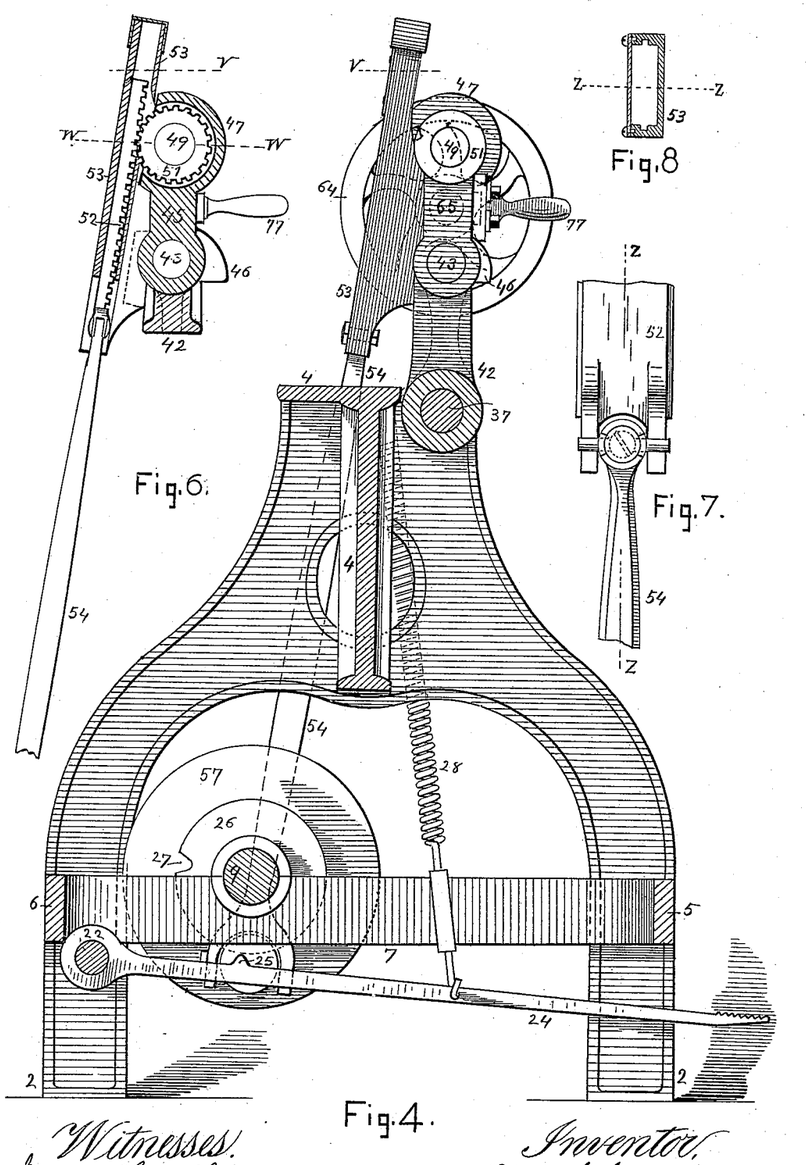
Fig. 4 is a sectional elevation, the section being transverse and vertical, and taken as on line X, Fig. 1, and the elevation as viewed from the left in said Fig. 1.
Fig. 6 is a vertical section taken as on line Z, Figs. 7, 8, 9, 10, through the rack and pinion, (and their supports,) by which a reciprocating rotary motion is imparted to the shoe while the heel is being burnished.
Fig. 7 is a back side elevation of the rack and its pitman, both partly broken away, shown in Fig. 1 and other figures.
Fig. 8 is a section taken as on line V, Figs. 4, 6, 9, but only showing the case in which the rack slides.
Figures 9, 12:
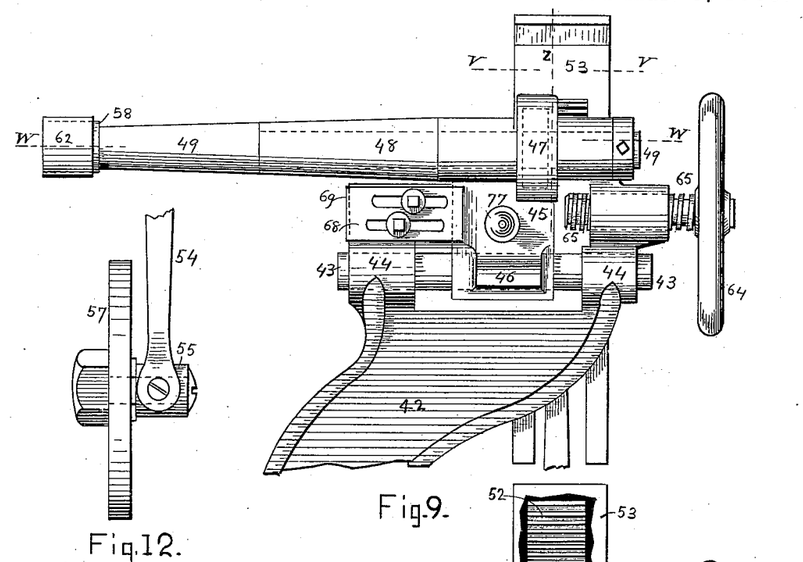
Fig. 9 is an enlarged detached front elevation of the right-hand upper part of the machine as viewed in Fig. 1.
Fig. 12 is an edge elevation of Fig. 11, and as viewed from the right thereof.
Figures 10, 11:
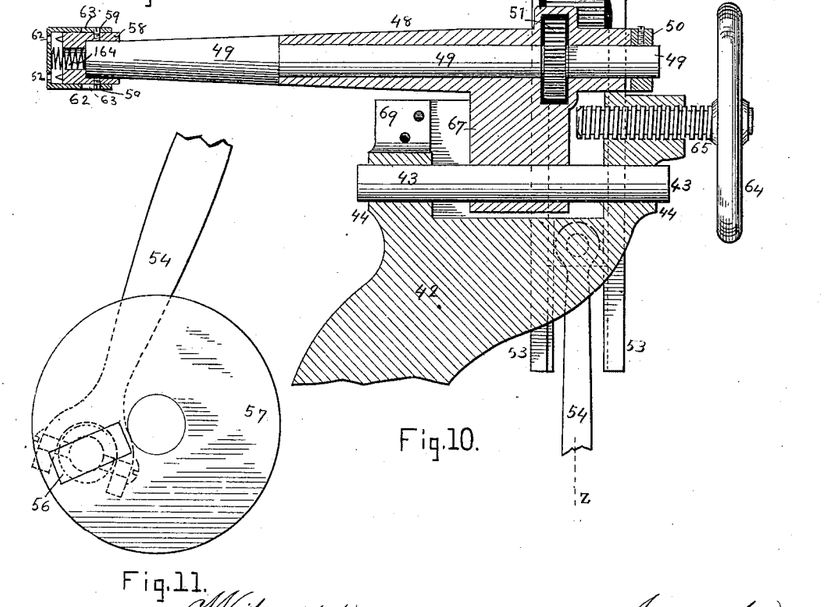
Fig. 10 is a vertical longitudinal section of the parts shown in Fig. 1, taken as on line Y, Fig. 4, and as viewed from the right in that figure.
Fig. 11 is a detached elevation taken as viewed from the left in Fig. 1, and showing the lower part of the rack-actuating pitman and the disk which constitutes its adjustable crank.

Upon the right-hand end of sleeve 38 is formed an arm, 42, in and upon which are arranged the devices for holding the boot or shoe, which are described as follows: A short rod, 43, is secured in the bosses 44, formed at the top of arm 42, as is clearly shown in Figs. 1, 9, 10, and upon said rod is mounted to slide and vibrate freely the bracket 45, which is of such width as to allow it to slide freely to a certain extent between bosses 44. Upon the front lower part of said bracket is formed the nose or projection 46, which, when the bracket is swung downward, as shown by dotted lines in Fig. 3, will, by its contact with arm 42, support the bracket in the position shown by said dotted lines. A pinion-case, 47, and sleeve 48 are also formed integral with said bracket. In said sleeve is journaled the shouldered arbor or arm 49, which is secured in place by set-collar 50, and upon said arbor is rigidly secured the pinion 51, arranged in said case 47, which is open at the back side, as shown in Fig. 6, to allow the engagement therewith of rack 52, which slides vertically in rack-case 53, secured to the back side of arm 42, as shown in Figs. 4, 6, said rack being vertically reciprocated by its pitman 54, which at its upper end is attached to the rack by a universal joint, as shown in Fig. 7, while its lower end is similarly connected with wrist-pin 55, which is adjustable in the slot 56 in disk 57, secured on driving-shaft 9, said parts being more clearly shown in Figs. 3, 11, 12.

Figures 13, 14, 15, 16, 17:
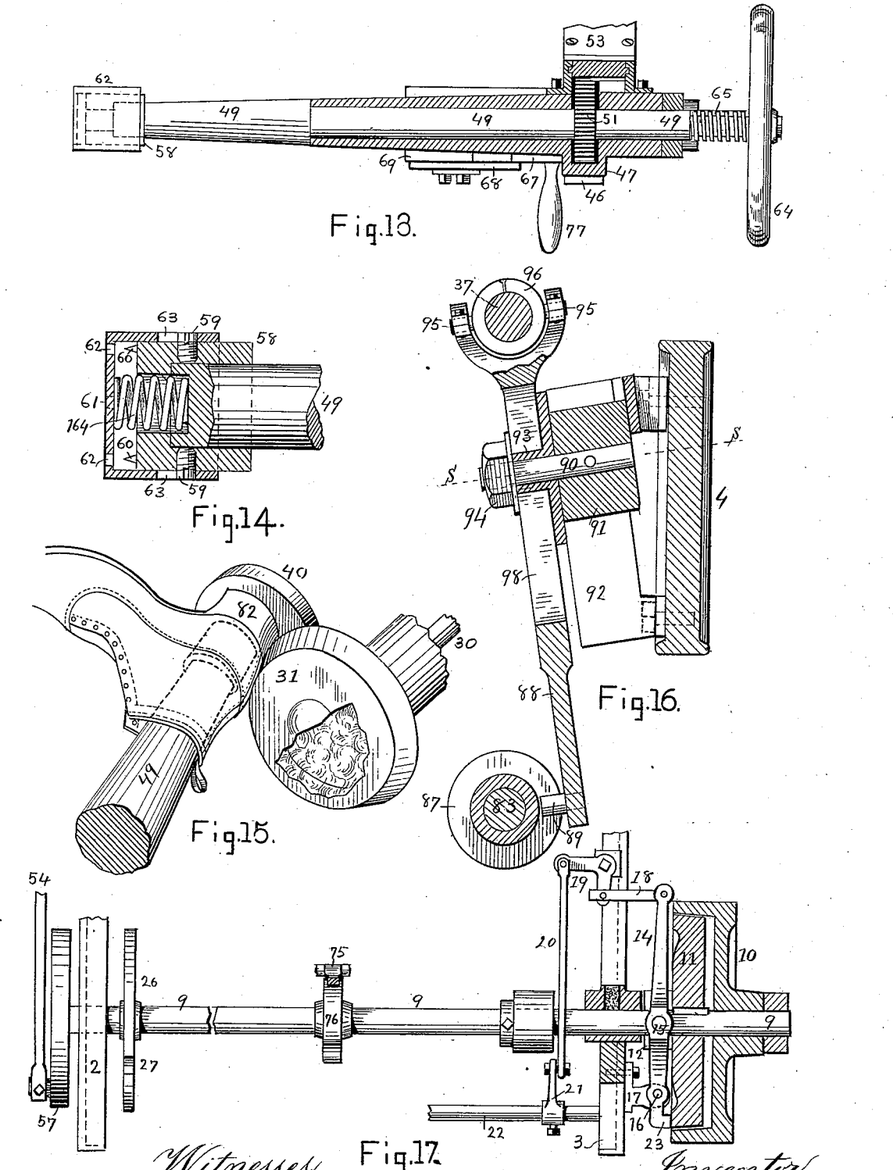
Fig. 13 is a horizontal section taken as on lines W, Figs. 6, 9.
Fig. 14 is an enlarged detached section of the left-hand part of Figs. 9, 10.
Fig. 15 is an enlarged perspective view showing a shoe as mounted on its supporting-arm and as being acted on by the burnishing-disk.
Fig. 16 is an enlarged vertical sectional elevation taken as on line T, Fig. 18, and viewed as from the right in Fig. 1.
Fig. 17 is a sectional elevation showing the driving-arbor, its clutch, pulley, brake, &c., the section being vertical so far as it relates to the frame of the machine, and the view being from the back side, or as in Fig. 2.

For holding the boot or shoe upon arbor 49, I secure upon the end thereof, as shown in Fig. 14, a head, 58, secured in place by set-screws 59. In the end face of said head I insert a series of pointed spurs, 60, and I arrange on said head a cap, 61, formed with holes 62, through which spurs 60 may project when said cap is forced back by the pressure of the insole thereon, said cap being habitually forced outward, as shown in Fig. 14, by the action of spring 164, to the extent permitted by said screws 59, which pass through slots 63 in the shell of the cap.

The driving-shaft 9, on which the crank-like disk 57 is mounted, being, as before stated, always arrested at the same point in its revolution by the engagement of tooth 25 on treadle 24 in recess 27 of disk 26, the shoe-carrying arbor 49, which has an alternating rotary movement imparted to it by the described engagement with its pinion 51 of rack 52, whose pitman 54 is connected with and driven by said disk 57, will therefore always cease its rotary movement at the same point, the utility of which effect will be hereinafter explained.

In practice, the boot or shoe is placed upon arbor 49, as shown in Fig. 15, with the toe toward the operator and with the then horizontal axis of the sole about level. Then by actuating hand-wheel 64 the bracket 45 will by the action of screw 65 be slid to the left on its rod 43, thereby carrying arbor 49 in the same direction until the bottom of the shoe-heel bears against the rotary disk 40, when the spurs 60 are by the action of said screw forced into the insole, and the shoe is closely confined between said disk 40 and head 58 of arbor 49; but for the purpose of bringing the shoe-heel into and releasing it from contact with the heated burnishing-disk 31 when mounted on arbor 49, I employ the following instrumentalities: An adjustable locking-plate, 68, is secured, by set-screws passing through longitudinal slots therein, to an extension, 69, Figs. 10, 13, of arm 42, and an extension, 67, of bracket 45 is arranged to pass inside locking-plate 68, (see Figs. 9, 13,) when said bracket is in position to enmesh pinion 51 with rack 52, and when screw 65 is retracted said bracket 45 may be released from said plate 68, and when said screw is advanced to confine the shoe-heel between head 58 and disk 40, as stated, the bracket 45 is held as interlocked by plate 68, such releasing and swinging forward of said bracket being requisite in order to move the shoe out of line with disk 40, so as to quickly release it from arbor 49 when it is burnished.

Figure 1:
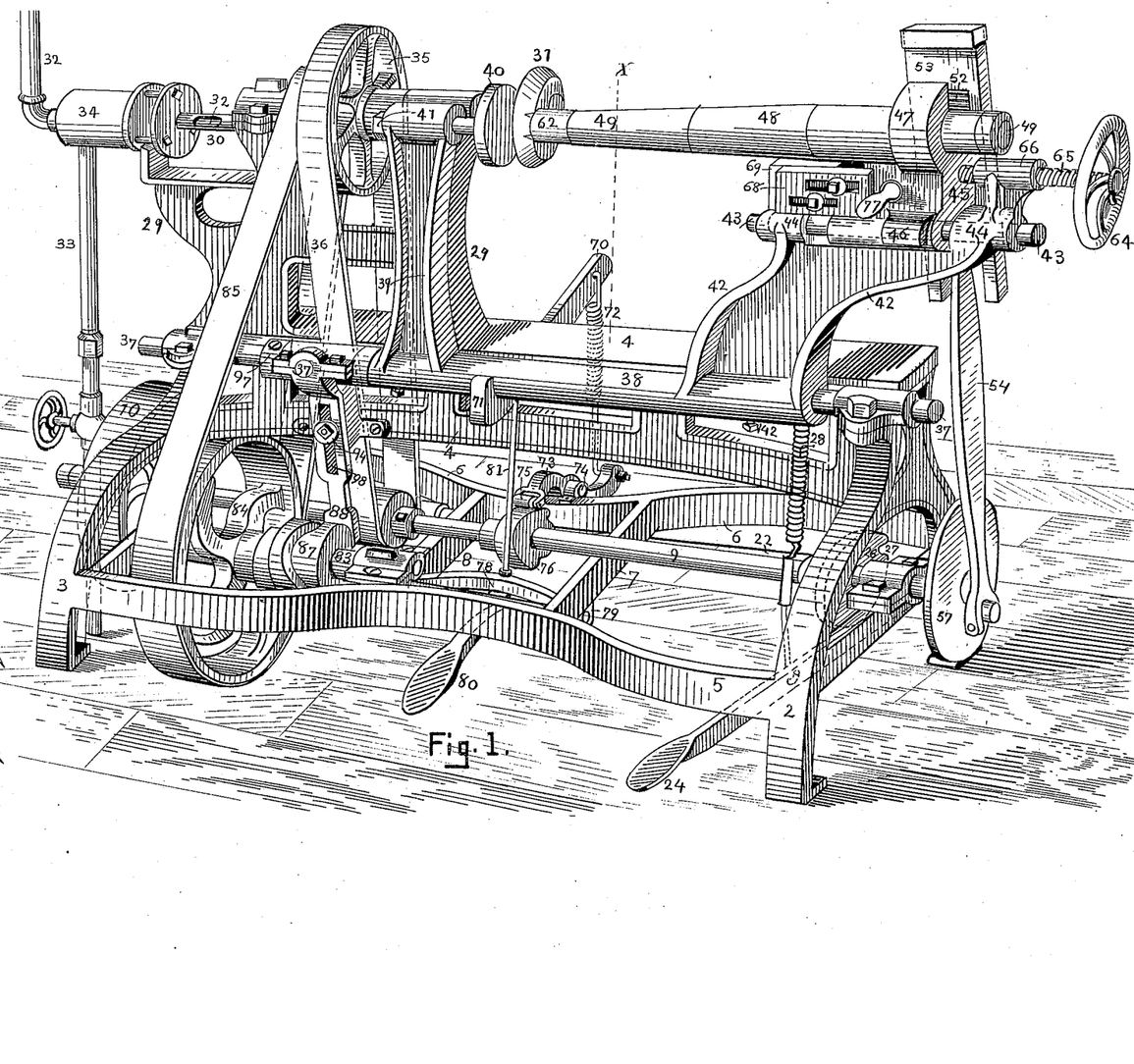
Figure 1 is a front perspective view of a machine embodying my invention.
Figure 2:
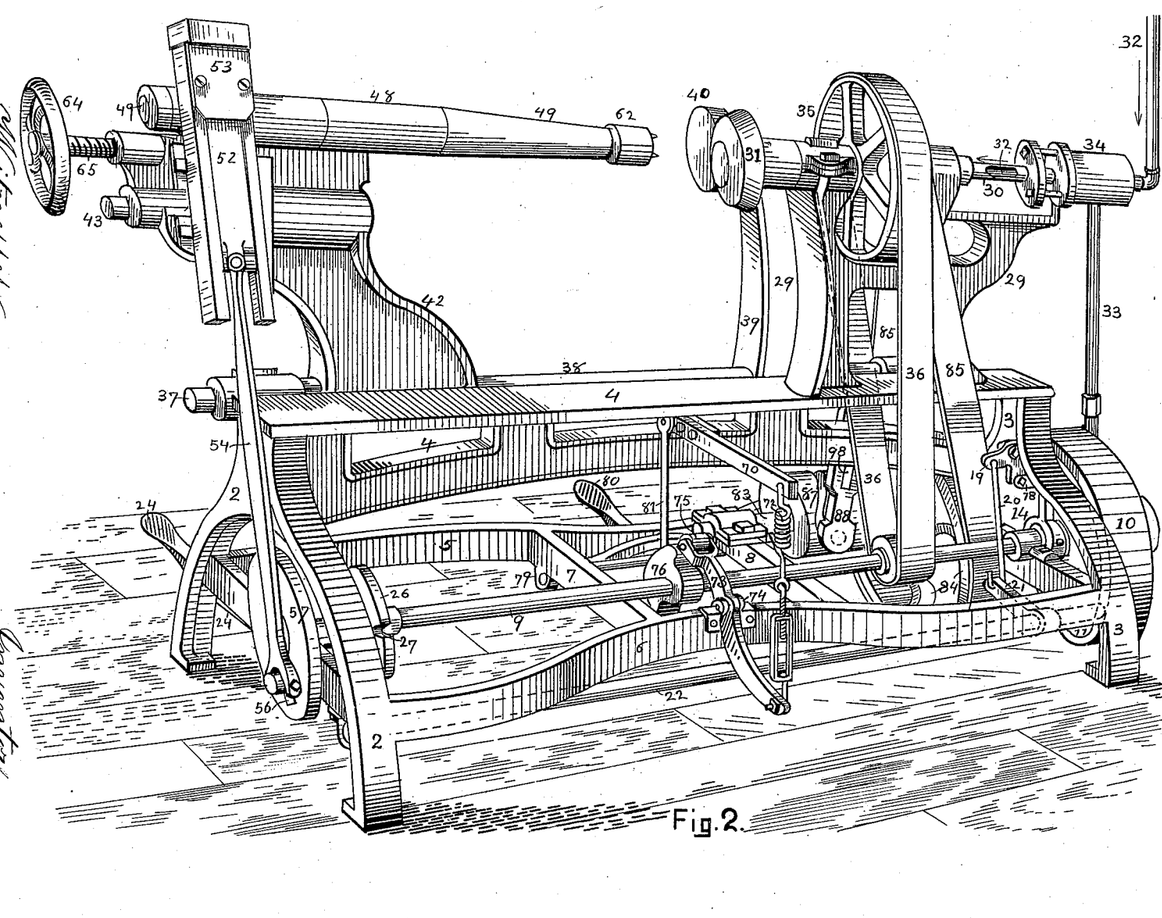
Fig. 2 is a reverse or rear perspective view of the same machine.

In addition to said swinging bracket, by which arbor 49 and the shoe thereon mounted are moved into and out of line with disk 40, and to produce the direct and actual pressure or contact between the heated rotary disk 31 and the heel-edge 82, I attach a lever, 70, Fig. 5, to a short arm, 71, formed on the jack-sleeve 38, and to the rear end of this lever I connect the contractile-acting spring 72, whose lower end is, by means of an adjusting turnbuckle, connected with the cam lever 73, pivotally mounted at or near its center on pivot 74, in a bracket attached, as shown, to the rear longitudinal frame-girt, 6. In the upper end of said cam-lever is pivoted a roll or trundle, 75, which engages cam 76, mounted on and driven by shaft 9, said cam being in half its circumference formed with a higher portion and in the other half with a lower line, as shown in Figs. 1, 2, 5. said disparity in the diameter of said cam being requisite on account of the reverse action of rack 52 on the jack, as, when said rack is in its upward movement, it tends, by its contact with pinion 51, to force the jack to the front, and so diminish the pressure between the shoe-heel and burnishing-disk, while the downward movement of the rack tends to increase said pressure, and hence said cam 76 is so timed that trundle 75 will traverse its high section when the rack is rising, and will traverse its low section when the rack descends, thereby equalizing the pressure on the heel-edge. Said bracket 45 is raised and lowered by means of its handle 77, and said locking-plate 68 is so lineally adjusted and secured, relatively to the thickness of the heels being burnished, as that bracket 45 will pass inside the plate but a short distance, as thereby screw 65 need be advanced or retracted but a short distance to lock or release the heel.

When the heel of each shoe is burnished, it is requisite to relieve the pressure of the heel upon disk 31 before attempting to slide bracket 45 out of contact with plate 68; and for the purpose of so disengaging the shoe-heel from disk 31, I pivot a rocking frame, 78, in the pendants 79 of transverse bars 7 8 of the frame, Figs. 1, 5, and to this frame I rigidly secure treadle 80; and in the center of the rear of said rocking frame I step the rod 81, whose upper end is pivoted to lever 70, between spring 72 and sleeve 38, but nearer the latter, whereby when downward pressure is applied to the front end of said treadle said lever will be elevated, thereby rocking the jack forward a limited distance, and so as to disengage the shoe-heel 82 from disk 31, and so that bracket 45 may be unlocked, the shoe and its arm swung freely forward, the shoe removed and replaced by another, when the bracket is again raised and locked, the treadle released to allow spring 72 to bring heel 82 and the continuously-rotating disk 31 into contact.

As it is desirable to burnish heels of all thicknesses by means of the same heated disk, it is necessary that the shoe and its supporting-arbor 49 should have a reciprocating lineal movement of such extent as to bring all parts of the heel in contact with said disk, and, to effect such movement of the shoe and arbor, I journal a short arbor, 83, in the lower part of the frame, as shown in Figs. 1, 2, 3, 5, motion being imparted to said arbor through its pulley 84, on which is belt 85, driven by pulley 86, mounted on arbor 30, which drives the burnishing-disk. Upon this arbor 83 is rigidly secured the cam 87, which engages stud 89 of lever 88, which is pivoted on bolt 90, secured in block 91, which is seated to be vertically adjusted between the side bars, 92, of the small guiding-frame secured to cap-bar 4, Figs. 16, 18, a flanged washer, 93, being seated on bolt 90, with its base or flange resting on bars 92, while the sleeve passes through the elongated slot 98 in lever 88, a threaded nut, 94, on said bolt serving, by its pressure on said sleeve 93 and by its action on the bolt, to lock block 91 at any desired point, yet leaving lever 88 free to vibrate on said sleeve as a pivot. The upper bifurcated end of said lever is pivotally connected with trunnions 95 of sleeve 96, which is loosely mounted on the rocking jack-shaft 37 between the jack-sleeve 38 and set-collar 97, both of which are firmly locked by set-screws to said rock-shaft.

It will be obvious that as arbor 83 is rotated the cam 87 will impart a vibratory movement to lever 88, thereby imparting a reciprocating lineal movement to rock-shaft 37 and the jack thereon carried, and that the heel 82 of the shoe will thereby be moved in the direction of the axis of disk 31, so as to bring all parts of the heel in contact therewith.

By means of the vertical adjustment and locking of block 91 at any desired height, the extent of lineal movement of the jack and shaft 37 may be varied as the thickness of the heel may render requisite.

The desirability of arresting the rotation of driving-shaft 9 at the same point in its revolution by means of treadle 24 having its stud 25 to enter notch 27 in disk 26, and by the described clutch and brake devices on said shaft 9, whereby the reciprocating rotation of the shoe-carrying arm 49 will also be arrested in all cases at the same point in its rotation, consists in the fact that by always placing and locking the shoe on its said arm 49 in the same position—say horizontal—as described, and as shown in Fig. 5, and with the enmeshing of rack 52 and pinion 51, and the position of crank-disk 57 once properly timed relatively to the stopping-point of shaft 9, the extremes of rotary reciprocation of the arm 49 will exactly carry the heel 82 from one end of its curved arc to the other in its contact with the burnishing-disk; and by changing the position of the wrist-pin in slot 56 of disk 57, so as to impart to pitman 54 and the rack 52, thereby actuated, a movement according to the length of the arc of the shoe-heel, the arm 49 will be rotated to the exact extent required to bring all parts of said arc in contact with the burnishing-disk.

I claim as my invention—

1. In a heel-burnishing machine, the combination, with a burnishing-disk, of devices, substantially as specified, adapted and arranged to lock and support the shoe, and to reciprocate the same both in a lineal direction parallel to the axis of said disk and in the arc of a circle coincident, or nearly so, with the length of the arc of the heel-edge, substantially as specified.

2. The combination of the rotary burnishing-disk 31, shoe-carrying arm 49, and the heel-abutting disk 40, the crank-driven rack 52 and pinion 51, for imparting a rotary reciprocation to said arm, the vibrating jack carrying said arm on the rack and pinion, with means for rocking said jack to insure contact between disk 31 and the shoe-heel, and rotary cam 87 and its coacting lever 88, arranged to lineally reciprocate said arm 49 and the shoe thereon secured, substantially as specified.

3. The combination, with the vibrating shoe-supporting jack, with its lever 70, spring 72, and rocking lever 73, of rotary cam 76, formed with a higher and lower arc, whereby the tension upon said spring is alternately increased and decreased as the action of rack 52 upon said jack is successively reversed, substantially as specified.

4. The combination, with the vibrating jack provided with means for holding and reciprocating the shoe, of hinged bracket 45, with means for locking and releasing the same, substantially as specified.

5. The combination, with the vibrating and lineally-reciprocating jack having the rotary shoe-carrying arbor mounted thereon and provided with its actuating-pinion, of rack 52, adjustable crank-disk 57, and pitman 54, connected with said rack and disk by universal joints to allow the lineal and vibratory movement of said jack, substantially as specified.

6. In a heel-burnishing machine, a jack adapted and arranged to be reciprocated in a direction parallel with the axis of the burnishing-disk, to be vibrated toward and from said disk to make and break contact of the shoe-heel therewith, and also carrying a shoe-supporting arm, with combined devices, substantially as described, adapted to impart a rotary reciprocation to said arm and the shoe thereon supported, substantially as specified.

7. The combination of burnishing-disk 31, the pivoted jack, its heel-abutting disk 40, the shoe-carrying arm 49, with its pinion 51, rack 52, with means for reciprocating the same, and arm 70, spring 72, lever 73, and rotary cam 76, for imparting pressure of the shoe-heel upon the burnishing-disk, all substantially as specified.

8. The combination, with the rotary burnishing-disk, the jack, and its shoe-carrying arm, of driving-shaft 9, the pulley and coacting clutch thereon mounted, a crank or crank-disk mounted on said shaft, with coacting devices to rotate said shoe-carrying arm, the treadle 24 and disk 26, arranged and adapted to interlock, and the clutch-actuating devices arranged to be actuated by said treadle to release or lock said clutch with its coacting pulley, substantially as specified.

9. The combination, with the vibrating jack, its rocking lever 70, the tension-spring 72, and means for adjusting the action thereof, of treadle 80, duly pivoted, and its rod 81, connected with said lever 70, and adapted through the action of the treadle to rock said jack and break contact between the shoe-heel and burnishing-disk, substantially as specified.

10. The combination of the rotary burnishing-disk, the vibrating and lineally-reciprocating jack, its shoe-carrying arm and pinion thereon, the driving-shaft, its pulley and coacting clutch devices, the shipping and stopping treadle, with the coacting devices whereby it actuates said clutch, the cam and its coacting lever, whereby the jack is lineally reciprocated, and the treadle and tension devices, whereby the jack is vibrated toward or from the burnishing-disk, all substantially as specified.

11. The combination, with the rotary burnishing-disk, of the rotary heel-abutting support 40 and the shoe-supporting arm 49, both said heel-support and arm being arranged and provided with means, substantially as described, whereby they are coincidently reciprocated in the direction of the axis of the burnishing-disk, and are coincidently vibrated toward and from said disk, substantially as specified.

12. The combination, with rotary burnishing-disk 31, of the rotary heel-abutment 40 and arm 49, with means, substantially as described, for both clamping the shoe between the same and imparting thereto a rotary reciprocation coincident in extent with the length of the arc of the shoe-heel, substantially as specified.

13. The combination of the rotary burnishing-disk, the rotary heel-abutment, the shoe-carrying arm 49 and its hinged bracket arranged to slide upon its supporting-rod, a locking device, and an actuating device to force said arm toward the heel-abutment, all substantially as specified.

14. The combination, with rotary cam 87, slotted cam-lever 88, and jack-rod 37, of the vertically-adjustable fulcrum or pivot adapted to be locked in position to impart the required reciprocation to said rod and the jack thereon mounted, substantially as specified.

15. The combination, with arm 49, with its spurs 60, of sliding cap 61 and its expanding spring 164, substantially as specified.

OLIVER G. CRITCHETT.

Witnesses:
T. W. PORTER,
EUGENE HUMPHREY.